US010189169B2

(12) United States Patent
Varner

(10) Patent No.: US 10,189,169 B2
(45) Date of Patent: Jan. 29, 2019

(54) COLLAPSING BLADE

(71) Applicant: Joseph Arthur Varner, Las Cruces, NM (US)

(72) Inventor: Joseph Arthur Varner, Las Cruces, NM (US)

( * ) Notice: Subject to any disclaimer, the term of this patent is extended or adjusted under 35 U.S.C. 154(b) by 333 days.

(21) Appl. No.: 15/155,133

(22) Filed: May 16, 2016

(65) Prior Publication Data

US 2016/0368154 A1 Dec. 22, 2016

Related U.S. Application Data

(66) Substitute for application No. 62/182,700, filed on Jun. 22, 2015.

(51) Int. Cl.

| | |
|---|---|
| ***B62B 1/04*** | (2006.01) |
| ***B62B 1/10*** | (2006.01) |
| ***B62B 9/00*** | (2006.01) |
| ***B26B 1/04*** | (2006.01) |
| ***B26B 9/00*** | (2006.01) |
| ***B26B 1/00*** | (2006.01) |
| ***B26B 1/10*** | (2006.01) |

(52) U.S. Cl.

CPC .................. *B26B 1/04* (2013.01); *B26B 1/00* (2013.01); *B26B 1/10* (2013.01); *B26B 9/00* (2013.01)

(58) Field of Classification Search

CPC .. B26B 1/04; B26B 1/046; B26B 1/10; B26B 1/00; B26B 9/00

USPC .................................................... 30/153, 154

See application file for complete search history.

(56) References Cited

U.S. PATENT DOCUMENTS

| | | | | |
|---|---|---|---|---|
| 6,898,858 B1 * | 5/2005 | Spell | B23D 51/03 30/507 |
| 7,634,858 B1 * | 12/2009 | Frazer | B26B 29/02 30/151 |
| 2007/0124940 A1 * | 6/2007 | Hawk | B26B 1/04 30/161 |
| 2013/0247382 A1 * | 9/2013 | Hongquan | B26B 5/001 30/156 |
| 2015/0239134 A1 * | 8/2015 | Duey | B26B 1/046 30/159 |
| 2018/0154531 A1 * | 6/2018 | Caswell | B26B 1/00 |

* cited by examiner

*Primary Examiner* — Ruth Ilan

(57) ABSTRACT

A collapsing blade comprising an upper and lower handle section joined at the rear by pivotal means; a set of arms pivoted upon the lower handle section, a rear blade pivoted on the upper handle section by means of an embracing body; a front blade comprising a hollow portion and an edged portion pivotally attached to said arms and rear blade; wherein by angular rotation of handle sections the blade assembly is arranged from collapsed to extended configurations.

2 Claims, 3 Drawing Sheets

FIG. 1
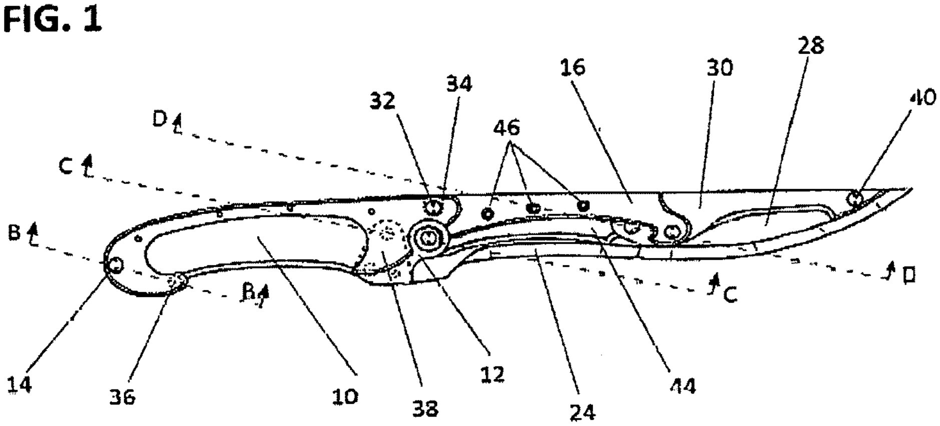
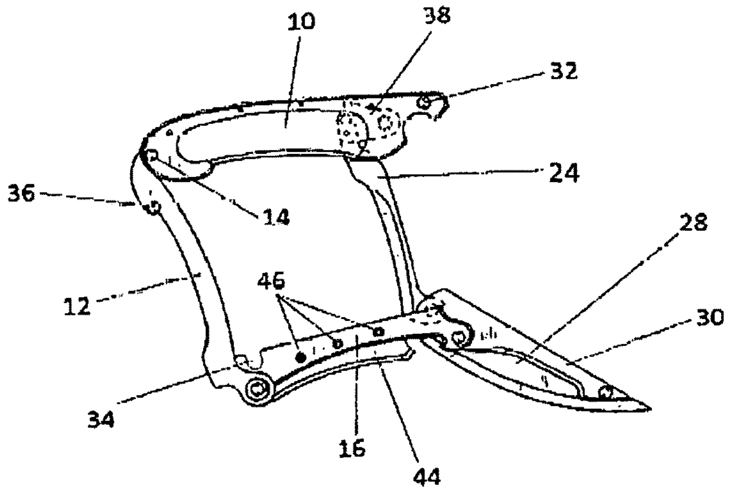
FIG. 2

FIG. 3
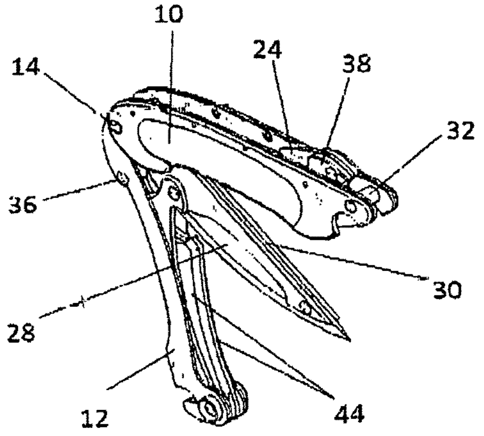
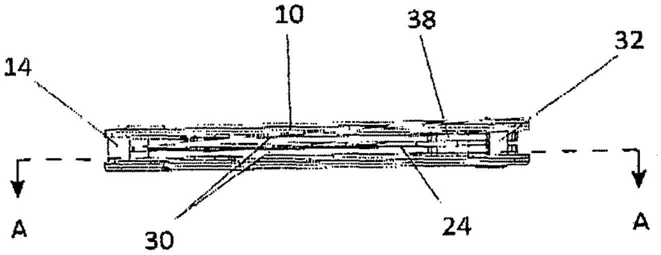
FIG. 4

FIG. 5
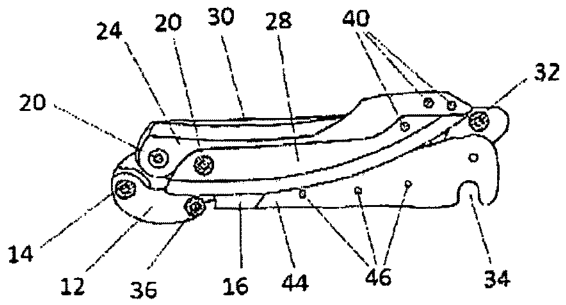
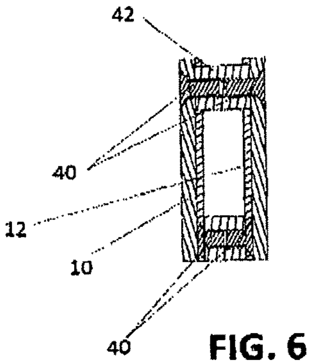
FIG. 6
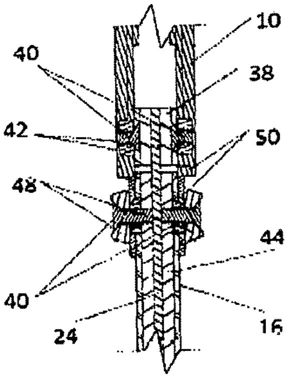
FIG. 7
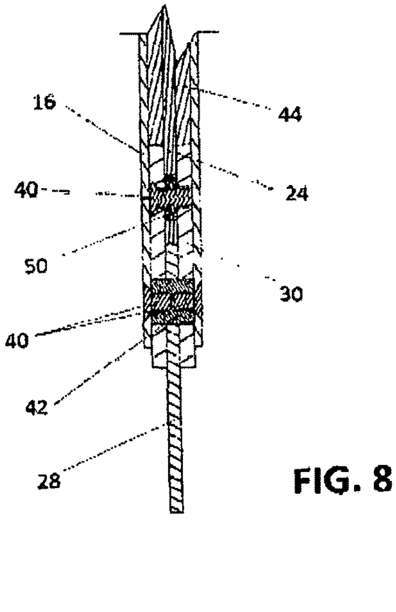
FIG. 8

COLLAPSING BLADE

BACKGROUND OF THE INVENTION

Field of the Invention

The present invention relates to folding knives, specifically knives with folding blades which comprise multiple components.

Description of the Prior Art

Folding knives are a commonly practiced art. Typically, a folding knife comprises a hollow section between two side walls of a handle. An axel, or pin, is located on a distal end of the handle by which a knife blade, centered between the side walls, is provided with a means of pivotal movement. The knife has a deployed configuration in which the end point of the blade is positioned opposite and at the farthest point from the rear end of the handle. The sharpened edge of the knife blade is exposed and can be used for cutting, slicing, etc. The knife has a closed configuration in which the end point of the blade is adjacent to the rear end of the handle. The sharpened edge of the knife blade is isolated between the handle side walls and the knife is safe for storage, carry, etc.

In other embodiments known in the , folding knives comprise Handles which are divided as two main hollow sections which rotate in opposite directions by means of axels or pins located at the rear of the knife blade. The knife has a deployed configuration in which the end point of the blade is positioned opposite the rear ends of the handle sections. The sharpened edge of the knife blade is exposed and can be used for cutting, slicing, etc. The knife has a closed configuration in which the far ends of the handle sections are adjacent the end point of the knife blade, the sharpened edges of which are isolated within the hollow handle sections making the knife safe to store, carry, etc.

For the purpose of effectively isolating the sharpened edges and points of the knife blades in the described embodiments, the handles of folding knives must be larger in size than the knife blades which are isolated therein causing unappealing aesthetics, unwieldly weight distribution and limitations on blade effectiveness by cause of blade size to handle size ratios.

Thus there is a need in the art for a folding knife with a collapsing blade. While addressing the described problems in the art, the present invention addresses these as well as other needs.

SUMMARY OF THE INVENTION

In a preferred embodiment, the invention is a collapsing blade comprising a handle construction divided into two main hollow sections which are joined at the rear by pivotal means. A set of arms are pivoted on the front of handle, and are capable of occupying folded and extended positions. A front blade comprising an edged portion as well as a hollow portion is attached to said arms by pivotal means. A rear blade is attached to the front blade by pivotal means and to the handle by pivotal means. The collapsing blade has a folded configuration in which the rear of the front blade is adjacent to the rear of the frame. The arms as well as the edged front blade portion and rear blade occupy positions within the handle which isolate sharpened edges and the collapsing blade can be safely carried, stored, etc. The collapsing blade has an extended configuration in which the arms support the front and rear blades outward with the sharpened edges exposed and the collapsing blade can be used for cutting, slicing, etc.

BRIEF DESCRIPTION OF THE DRAWINGS

FIG. 1 is an elevated view from the left side of the embodiment in an extended configuration.

FIG. 2 is an elevated view from the left side of the embodiment in a partially extended configuration.

FIG. 3 is a perspective view of the embodiment in a partially collapsed configuration.

FIG. 4 is an elevated view from the top of the embodiment in a fully collapsed configuration.

FIG. 5 is a sectional view of the embodiment in the fully collapsed configuration taken substantially along the line A-A in FIG. 4.

FIG. 6 is a sectional view taken substantially along the line B-B in FIG. 1 to show features of the invention.

FIG. 7 is a sectional view taken substantially along the line C-C in FIG. 1 to show features of the invention.

FIG. 8 is a sectional view taken substantially along the line D-D in FIG. 1 to show features of the invention.

DETAILED DESCRIPTION OF THE INVENTION

A preferred embodiment of the collapsing blade of the present invention is here and in figures disclosed. For clarity, within this document all reference to the top and bottom of the collapsing blade or the components thereof will correspond to the collapsing blade as oriented in FIG. 1, the top of the figure when oriented such that the text is upright corresponding to top of the collapsing blade, and the bottom of the figure when oriented such that the text is upright corresponding to the bottom of the collapsing blade. Likewise, all reference to the front of the collapsing blade or the components thereof will correspond to the rightmost part of the collapsing blade as viewed in FIG. 1 when oriented with the text upright, and all reference to the rear of the collapsing blade will correspond to the leftmost part of the collapsing blade as viewed in FIG. 1 when oriented with the text upright.

The embodiment of the invention in a fully extended configuration is displayed in FIG. 1. A set of inner arms 44, which are ridgidly affixed to a set of outer arms 16 by means of small screws 46, support a front blade portion 28 and hollow front blade portion 30, outward at the frontal end of the collapsing blade. It is to be appreciated by those knowledgeable in the art that in the present embodiment, the edged front blade portion 28 and hollow front blade portion 30 are ridgidly attached at the frontal end by means of screw 40, whereas is in other embodiments, the edged front blade portion 28 and hollow front blade portion may be joined together by weldment or formed as a singular piece. A rear blade 24 rests underneath the inner arms 44, and behind the edged front blade portion 28, pivoted upon the hollow front blade portion 30. An upper handle spacer 32 is configured upon an upper handle section 10 in such a manner than when the outer arms 16 are positioned outward as shown in FIG. 1, a locking groove 34 prevents rotational movement of the outer arms 16 thus providing the collapsing blade a degree of ridgidity in the extended configuration. It is to be appreciated by those knowledgeable in the art that the inner arms 44 and outer arms 16 of the embodiment disclosed are joined by small screws 46 whereas in other embodiments the inner arms 44 and outer arms 16 may be joined together by weldment or formed as a single piece.

An upper handle section 10 and a lower handle section 12 are both joined and provided a means of angular movement via a rear handle pivot 14. As the frontal ends of the upper handle section 10 and lower handle section 12 are separated, the embodiment adopts the configuration displayed in FIG. 2, in which the locking groove 34 is displaced from the upper handle spacer 32 granting the outer arms 16 rotational movement upon the lower handle section 12. The rear blade 24 is granted rotational movement upon the upper handle section 10 via a ridged paring to an embracing body 38, which is affixed to rear blade 24, by means of screws 40, and is pivotally attached to the upper handle section 10.

Dependent on the direction in which the outer arms 16 and rear blade 24 rotate, the edged front blade portion 28 and hollow front blade portion 30 are permitted movement forward into the configuration displayed in FIG. 1 as well as rearward into the configuration displayed in FIG. 3 in which the edged front blade portion 28 is aligned for insertion between the inner arms 44, and the rear blade 24 is aligned for insertion into the hollow front blade portion 30.

The frontal ends of the upper handle section 10 and lower handle section 12 can be brought together from the configuration displayed in FIG. 3 which will produce the fully collapsed configuration displayed in FIG. 4 and FIG. 5. It must be understood that the functionality of collapsing blades within the disclosed art depend solely upon the integral distribution of free space within the blades construction, which the components thereof occupy in the fully collapsed configuration. As illustrated in FIG. 4 and FIG. 5, when in the fully collapsed configuration, the space occupied by the rear blade 24 is not greater than the allotment of space granted by the hollow front blade portion 30 and the inner arms 44 when rotated into the fully collapsed configuration as illustrated in FIG. 4 and FIG. 5 are granted a sufficient allotment of space below the hollow front blade portion 30, with which to isolate the edged front blade portion 28.

As illustrated in FIG. 5, downward movement and protrusion of the edged front blade portion 28 is prevented by a lower handle spacer 36 which is rigidly affixed upon the lower handle section 12 as well as by a front blade pivot 22. Upward movement and protrusion of the rear blade 24 is prevented at the frontal end by the embracing body 38. Upward movement and protrusion of the rear blade 24 is prevented at the rear end by a rear blade pivot 20, yielding the collapsing blade safe for storage, carry, etc.

As illustrated in FIG. 6, the rear handle pivot 14 comprises two screws 40 which are inserted through opposing sides of the upper handle section 10 into a threaded standoff 42 upon which the lower handle section 12 is provided a means of rotational movement. The lower handle spacer 36 comprises two screws 40 which are inserted through opposing sides of the lower handle section 12 into a threaded standoff 42.

As illustrated in FIG. 7, the lower handle section 12 is provided a means of rotational movement at the frontal end upon spacers 50 which screws 40, inserted through washers 48 on opposing sides of the lower handle section 12, are passed through before being inserted into the outer arms 16 and inner arms 44. The upper handle section is granted a means of rotational movement at the frontal end upon threaded standoffs 42 which screws 40 are inserted into after being passed though opposing inner sides of the embracing body 38.

As Illustrated in FIG.

As illustrated in FIG. 8, the front blade pivot 22 comprises two screws 40 which are inserted through opposing sides of the outer arms 16 and through a spacer 50 upon which the hollow front blade portion 30 and edged front blade portion 28 are provided a means of rotational movement. The rear blade pivot 20 comprises a screw 40 which is inserted through a side of the hollow front blade portion 30, passed through a spacer 50, upon which the rear blade 24 is provided a means of rotational movement, and lastly, into a threaded side of the hollow front blade portion 30.

Thus the present invention discloses new and useful attributes of a folding knife that overcome issues presented by folding knives of prior art.

Having described a preferred embodiment of the collapsing blade of the present invention, it is to be appreciated and will be apparent to those skilled in the art that many changes not exemplified in the detailed description of the invention could be made without altering the inventive concepts and principles embodied therein. It is also to be appreciated that numerous embodiments incorporating only part of the preferred embodiment are possible which do not alter, with respect to those parts, the inventive concepts and principles embodied therein. The presented embodiments are therefore to be considered in all respects exemplary and/or illustrative and not restrictive, the scope of the invention being indicated by the appended claims, and all alternate embodiments and changes to the embodiments shown herein which come within the meaning and range of equivalency of the appended claims are therefore to be embraced therein I claim:

The invention claimed is:

1. A collapsible blade comprising:

a frame construction, said frame construction comprising two handle sections joined at their respect rears by a pivot;

a forward blade and rear blade pivotally connected to each other;

a set of arms pivoted on a lower of the two handle sections, wherein said arms are capable of occupying folded and extended positions; wherein when the arms are in their folded positions they are confined within the handle sections;

wherein the forward blade is pivotally connected to the arms;

wherein when the collapsible blade is in a fully folded configuration, the forward blade is located internally between the two handle sections and movement of the frame away from the forward blade extends said arms and creates a quadrilateral configuration of the two handle sections, the arms and the rear blade; and wherein continued movement of the two handle sections pivotally towards each other after reaching the quadrilateral configuration causes the collapsible blade to have a fully extended and lockable position.

2. The collapsible blade of claim 1, wherein each handle section has two respective halves and confinement of the arms within the handle section includes placement of the arms in between the two halves.

* * * * *